3,383,343
ELASTOMERIC POLYESTERS DERIVED FROM GLYCOLS, DIMERIZED FATTY ACIDS AND AROMATIC DICARBOXYLIC ACIDS
Ali Akbar Mohajer, Cwmbran, and Peter Raymond Thomas, Pontypool, England, assignors to British Nylon Spinners Limited, Pontypool, England
No Drawing. Filed May 15, 1964, Ser. No. 367,882
Claims priority, application Great Britain, June 14, 1963, 23,712/63
6 Claims. (Cl. 260—22)

This invention relates to the manufacture of synthetic polyesters and more particularly to synthetic elastomeric copolyesters derived from glycols, dimerized fatty acids and aromatic dicarboxylic acids.

Many copolyesters have been synthesized in the past in an endeavour to obtain elastomers having the required physical properties. Elastic linear copolyesters derived from acyclic and aromatic dicarboxylic acids e.g. sebacic acid and terephthalic acid, are described in British specification No. 711,280. Rubber-like copolyesters derived from glycols, dimeric fatty acids and alpha, omega dicarboxylic-alkanes, e.g. copolyesters from ethylene glycol, dilinoleic acid and adipic or sebacic acid are mentioned in "Industrial and Engineering Chemistry" 1949, vol. 41, page 1647 et seq. It has now been found that superior elastomeric copolyesters are obtainable from glycols, dimeric fatty acids and dibasic aromatic acids which are dicarboxylic acids containing one or two benzene rings wherein the two carboxyl groups are not in a peri or ortho position. The acids are preferably employed in the form of their lower alkyl, e.g. methyl, esters but, if desired, the free acids or other functional derivatives thereof can be employed, for instance, the acid chlorides. The glycol is a polymethylene glycol having from two to six carbon atoms.

The present copolyesters are conveniently made by heating polyester-forming functional derivatives, e.g. the dimethyl esters of the acids with an excess of the polymethylene glycol and a suitable catalyst at, say, 200° C. under atmospheric pressure until methanol ceases to be evolved. The temperature is then raised, for example to 250° C. and the pressure reduced to less than 1 mm. of mercury. Heating is continued until the resulting copolyester has an intrinsic viscosity, now to be defined, of at least 0.5. The intrinsic viscosity is defined as twice the natural logarithm of the quotient of the viscosity at 25° C. of a solution of ½% weight by volume of the polyester dissolved in a 1:1 by volume mixture of o-chlorophenol and 90% weight by weight aqueous phenol solution as solvent, divided by the viscosity of the said solvent at the same temperature. The proportion of dimeric fatty acid (or functional derivative thereof calculated as acid) should amount to from 45 to 70% by weight of the total acids (or functional derivatives thereof calculated as acids). Instead of the dimeric fatty acid a hydrogenated derivative thereof may be employed. The present copolyesters may be melt-spun into elastomeric filaments.

Accordingly the invention consists of copolyesters obtainable by heating a polymethylene glycol having from two to six carbon atoms together with a dimeric fatty acid or hydrogenated dimeric fatty acid or a polyester-forming functional derivative of said fatty acid or hydrogenated fatty acid, and a dicarboxylic aromatic acid containing one benzene ring, two benzene rings joined by a carbon-carbon link or by a divalent grouping, or a napthalene ring, wherein the two carboxyl groups do not occupy peri or ortho positions, or a polyester-forming functional derivative of said aromatic acid, until the resulting copolyester has an intrinsic viscosity of at least 0.5, the proportion of dimeric fatty acid (or functional derivative thereof calculated as the acid) amounting to from 45 to 70% by weight of the total acids (or functional derivatives thereof calculated as the acids).

Examples of the polymethylene glycol are ethylene glycol, trimethylene glycol and tetramethylene glycol.

As dimeric fatty acids and hydrogenated dimeric fatty acids there may be employed, for instance, dielaidic, dilinoleic acid, dilinolenic acid, dioleic acid, or hydrogenated dilinoleic acid.

The dicarboxylic aromatic acids may be for instance:
terephthalic acid
4,4′-dicarboxydiphenyl
isophthalic acid
4-methylisophthalic acid
4,4′-dicarboxydiphenylmethane
4,4′-dicarboxydiphenylethane
ethylene bis(4-oxybenzoic acid)
tetramethylene bis (4-oxybenzoic acid)
4,4′-dicarboxydiphenyl sulphide
4,4′-dicarboxydiphenyl sulphone
2,3′-dicarboxydiphenyl sulphone
2,6-dicarboxynaphthalene
1,5-dicarboxynaphthalene
2,7-dicarboxynaphthalene
1,6-di-(p-carboxy benzamido)-hexane Preferably the proportion of dimeric fatty acid (or polyester-forming functional derivative thereof calculated as the acid) amounts to from 55 to 65% by weight of the total acids (or polyester-forming functional derivatives thereof calculated as the acids).

Instead of heating the polymethylene glycol with the dimeric fatty acid and the aromatic acid, or say, with the lower alkyl e.g. methyl esters of these acids, the present copolyesters can be made by heating together in vacuo the diglycol esters of the dimeric fatty acid and of the aromatic acid until a copolyester of the desired intrinsic viscosity is obtained.

As already mentioned it is convenient to employ a suitable catalyst in the condensation polymerization of the glycol and dicarboxylic acids, and many substances have been proposed e.g. metals, alkali metal oxides, boron trioxide, lead acetate, calcium acetate, but antimony compounds e.g. antimony trioxide are particularly efficaceous.

The invention includes elastomeric filaments which have been melt-spun from the foregoing copolyesters.

Amongst the reagents employed in making the present copolyesters there may be included pigments, plasticizers, delustrants or stabilizers. Small quantities of polyfunctional cross-linking agents may also be added, e.g. trimesic acid, glycerol, trimethylol propane, provided care is taken to restrict the quantity used and thus limit the ensuing cross-linking so as not to prejudice the suitability of the copolyester for melt-spinning.

In the following examples, which are intended to illustrate but not limit the invention, the parts are parts by weight.

Example 1

The following reagents are heated at 180°–220° C. under nitrogen at atmospheric pressure with vigorous agitation.

| | Parts |
|---|---|
| Mixed dimethyl esters of dioleic, dilinoleic and dilinolenic acids | 34 |
| Dimethyl terephthalate | 20 |
| Ethylene glycol | 40 |
| Antimony trioxide | 0.025 |
| Calcium acetate | 0.075 |

When the evolution of methanol ceases the temperature is slowly raised to 275° C. and most of the excess of ethylene glycol distilled off. The pressure is then reduced below 0.1 mm. mercury and the condensation polymerization continued at 275° C. with the evolution of ethylene glycol for about 6 hours.

The resulting copolyester has an intrinsic viscosity of 0.64. The copolyester sticks, i.e. starts to have a molten trial when dragged along a hot surface, when the temperature of the latter is raised to 130° C.

The copolyester is melt-spun at 230° C. into a yarn of 5 filaments, talcum powder being applied to the filaments to prevent sticking. The filaments shrink in boiling water by 33%. They then possess an elastic recovery of 97% from 25% extension. The corresponding work recovery is 90%. (The work recovery of a yarn is expressed by the fraction obtained by dividing the energy or work expended in stretching the said yarn by applying a stress thereto into the energy or work recovered when the said yarn retracts to its original dimensions on the release of the stress. The fraction is commonly expressed as a percentage.)

Example 2

200 parts of dimethyl terephthalate are mixed with 300 parts of ethylene glycol and 0.3 part of calcium acetate together with 0.1 part antimony trioxide added. The mixture is heated to boiling under a reflux condenser in an atmosphere of nitrogen and the methanol evolved distilled off. When no more methanol is produced, the temperature will have reached ca. 240° C. and there remains a solution of diglycol terephthalate in an excess of the glycol.

In a similar manner, a mixture of the dimethyl esters of dioleic, dilinoleic and dilinolenic acids is converted to a mixture of the corresponding ethylene glycol esters by heating the following reagents with efficient agitation in an atmosphere of nitrogen under a reflux condenser.

| | Parts |
|---|---|
| Mixed dimethyl esters of dioleic, dilinoleic and dilinolenic acids | 300 |
| Ethylene glycol | 300 |
| Calcium acetate | 0.3 |
| Antimony trioxide | 0.1 |

There results a mixture of diglycol dioleate, diglycol dilinoleate, diglycol dilinolenate and (excess) ethylene glycol. This mixture is added to the above-mentioned solution of diglycol terephthalate, and the temperature slowly raised to 275° C. until most of the excess of ethylene glycol has distilled off. The pressure is then reduced below 0.1 mm. mercury and the condensation polymerization continued at 275° C. with the evolution of ethylene glycol for about 6 hours.

The resulting copolyester has an intrinsic viscosity of 0.61 and a stick temperature of 153° C.

Example 3

The following reagents are heated at 180°–220° C. under nitrogen at atmospheric pressure with vigorous agitation.

| | Parts |
|---|---|
| Mixed dimethyl esters of dioleic, dilinoleic and dilinolenic acids | 30 |
| Ethylene glycol | 20 |
| Trimethyl trimesate | 0.25 |
| Antimony trioxide | 0.025 |
| Calcium acetate | 0.075 |

When the evolution of methanol ceases, the temperature is slowly raised to 280° C. and maintained at this temperature for about 2 hours. The temperature is then allowed to fall to about 200° C. A solution of 26.2 parts of bis-beta-hydroxyethyl terephthalate in 35.6 parts of ethylene glycol at 110° C. is added. The temperature is raised to 280° C. and most of the excess of ethylene glycol distilled off. The pressure is then reduced below 0.1 mm. mercury and the condensation polymerization continued at 280° C. with the evolution of ethylene glycol for 4½ hours.

The resulting copolyester has an intrinsic viscosity of 0.74 and a Vicat softening point of 166° C. The latter is determined by a penetrometer similar to the apparatus described by Edgar and Ellery at page 2638 of the Journal of the Chemical Society, 1952.

The copolyester is melt-spun at 240° C. into a yarn of 10 filaments which are dusted with talcum powder. The filaments possess the following properties:

| | From an extension of— | |
|---|---|---|
| | 25% | 100% |
| Elastic recovery | 98% | 93% |
| Work recovery | 83% | 67% |

Example 4

Example 3 is repeated except that the 0.25 part of trimethyl trimesate is replaced by 0.23 part of glycerol.

The resulting copolyester has an intrinsic viscosity of 0.88 and a Vicat softening point of 152° C.

Filaments melt-spun therefrom exhibit the following properties.

| | From an extension of— | |
|---|---|---|
| | 25% | 100% |
| Elastic recovery | 98% | 93% |
| Work recovery | 88% | 68% |

Example 5

The following reagents are heated at 180°–220° C. under nitrogen at atmospheric pressure with vigorous agitation.

| | Parts |
|---|---|
| Mixed dimethyl esters of hydrogenated dioleic, dilinoleic and dilinolenic acids | 55 |
| Ethylene glycol | 80 |
| Antimony trioxide | 0.03 |
| Calcium acetate | 0.09 |

When the evolution of methanol ceases the temperature is slowly raised to 280° C. and the manufacture of the polyester finished off as described in Example 3 except that 59 parts of bis-beta-hydroxyethyl terephthalate and 125 parts of ethylene glycol are employed instead of 26.2 parts and 35.6 parts respectively.

The resulting copolyester has an intrinsic viscosity of 0.77 and a Vicat softening point of 162° C. The polyester is melt-spun into a yarn of 5 filaments which has the following properties:

| | |
|---|---|
| Tenacity _____grams per denier__ | 0.26 |
| Extensibility at break _____percent__ | 603 |
| Elastic recovery, percent extension: | |
| From 25 _____do____ | 95 |
| From 100 _____do____ | 88 |
| Work recovery, percent extension: | |
| From 25 _____do____ | 82 |
| From 100 _____do____ | 53 |

The yarn shows high resistance to cleaning solutions and solvents.

Example 6

Example 5 is repeated except that the 59 parts of bis-beta-hydroxyethyl terephthalate and 125 parts of ethylene glycol are replaced by a hot solution of 45 parts of dimethyl 2,6-naphthalene dicarboxylate in 80 parts of ethylene glycol. After the addition of the aforesaid solution the temperature is raised to 220° C. and the methanol distilled off. Most of the excess of ethylene glycol is then removed by raising the temperature to 280° C. The pressure is reduced to 0.1 mm. of mercury and the condensation continued at the aforesaid temperature for 4½ hours.

The resulting copolyester has an intrinsic viscosity of 0.76 and a Vicat softening point of 158° C. Filaments melt-spun from the polymer at 260° C. possess an elastic recovery of 87% and a work recovery of 60%, the extension being 50% in each case.

What we claim is:

1. A copolyester having an intrinsic viscosity of at least 0.5 of a polymethylene glycol containing from two to six carbon atoms, a dimeric fatty acid and an aromatic dicarboxylic acid comprising not more than two benzene rings wherein the two carboxyl groups do not occupy peri or otho positions, the aforesaid dimeric fatty acid constituting from 55% to 65% by weight of the total dimeric fatty and aromatic acids.

2. A copolyester claimed in claim 1 wherein the dimeric fatty acid is selected from the class consisting of dioleic, dilinoleic and dilinolenic acids, and the aromatic acid is terephthalic acid.

3. A copolyester claimed in claim 1 wherein the dimeric fatty acid is a hydrogenated dimeric fatty acid.

4. A copolyester of from 55 to 65% by weight of ethylene glycol dilinoleate and from 35% to 45% by weight of ethylene glycol terephthalate, having an intrinsic viscosity of at least 0.5.

5. An elastomeric filament consisting of a copolyester having an intrinsic viscosity of at least 0.5 of a polymethylene glycol containing from two to six carbon atoms, a dimeric fatty acid and an aromatic dicarboxylic acid comprising not more than two benzene rings wherein the two carboxyl groups do not occupy peri or ortho positions, the aforesaid dimeric fatty acid constituting from 55% to 65% by weight of the total dimeric fatty and aromatic acids.

6. An elastomeric filament consisting of a copolyester of from 55 to 65% by weight of ethylene glycol dilinoleate and from 35% to 45% by weight of ethylene glycol terephthalate, having an intrinsic viscosity of at least 0.5.

References Cited

UNITED STATES PATENTS

| | | | |
|---|---|---|---|
| 3,311,578 | 3/1967 | Laakso | 260—22 |
| 1,799,420 | 4/1931 | Holton | 260—22 |
| 2,111,427 | 3/1938 | Kittredge | 260—22 |
| 2,429,219 | 10/1947 | Cowan et al. | 260—22 |
| 3,057,824 | 10/1962 | Le Bras et al. | 260—22 |
| 3,158,584 | 11/1964 | Layman | 260—22 |

FOREIGN PATENTS 862,583   3/1961   Great Britain.

DONALD E. CZAJA, *Primary Examiner.*

L. J. BERCOVITZ, R. W. GRIFFIN,
*Assistant Examiners.*